(12) United States Patent
Boettcher et al.

(10) Patent No.: US 9,238,847 B2
(45) Date of Patent: Jan. 19, 2016

(54) TAILORED HARDENING OF BORON STEEL

(75) Inventors: Eric Boettcher, Columbus, OH (US); Robb Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 573 days.

(21) Appl. No.: 13/198,838

(22) Filed: Aug. 5, 2011

(65) Prior Publication Data

US 2013/0032257 A1    Feb. 7, 2013

(51) Int. Cl.
| | |
|---|---|
| *C21D 1/18* | (2006.01) |
| *B21D 22/02* | (2006.01) |
| *C21D 9/00* | (2006.01) |
| *C21D 1/62* | (2006.01) |
| *H05B 6/10* | (2006.01) |
| *H05B 6/38* | (2006.01) |
| *H05B 6/40* | (2006.01) |

(52) U.S. Cl.
CPC ............. *C21D 1/18* (2013.01); *B21D 22/022* (2013.01); *C21D 1/62* (2013.01); *C21D 9/0062* (2013.01); *H05B 6/101* (2013.01); *H05B 6/38* (2013.01); *H05B 6/40* (2013.01); *C21D 2221/00* (2013.01); *Y02P 10/253* (2015.11)

(58) Field of Classification Search
CPC ....................................................... C21D 1/18
USPC .......................................... 148/639–644, 714
See application file for complete search history.

(56) References Cited

U.S. PATENT DOCUMENTS

| | | | |
|---|---|---|---|
| 2,365,183 A | 12/1944 | Forsberg | |
| 2,576,342 A | 11/1951 | Hess et al. | |
| 2,831,788 A | 4/1958 | Bridge et al. | |
| 3,352,724 A | 11/1967 | McNitt et al. | |
| 3,460,815 A | 8/1969 | Corteggiano et al. | |
| 4,441,698 A | 4/1984 | Limque et al. | |
| 6,059,899 A * | 5/2000 | Shibata et al. | 148/320 |
| 6,294,130 B1 | 9/2001 | Hajaligol et al. | |
| 6,564,604 B2 | 5/2003 | Kefferstein et al. | |
| 6,632,302 B2 | 10/2003 | Fisher et al. | |

(Continued)

FOREIGN PATENT DOCUMENTS

| | | |
|---|---|---|
| EP | 0 816 520 A2 | 1/1998 |
| JP | 08-041531 | 2/1996 |

(Continued)

OTHER PUBLICATIONS

PCT International Search Report from corresponding PCT/US2012/049340 mailed Oct. 24, 2012.

*Primary Examiner* — Brian Walck

(74) *Attorney, Agent, or Firm* — William R. Fisher

(57) ABSTRACT

Disclosed are methods, systems and apparatus for manufacturing complex three dimensional open structures by cold forming the component from unhardened metal stock and then selectively heating and quenching the metal to provide the desired strength profile across the component. The metal is initially formed of unheated and unhardened metal through a combination of rolling, stamping and/or milling operations to produce a component having a complex three dimensional open structure. The formed component is then hardened in strategically predetermined areas by sequentially heating and quenching the predetermined areas of the component. The heating and cooling elements are, in turn, provided on at least one robotic apparatus configured for moving the elements across the surface of the component in a manner sufficient to achieve the desired pattern of hardened and unhardened regions across the component.

7 Claims, 7 Drawing Sheets

(56) References Cited

U.S. PATENT DOCUMENTS

| | | |
|---|---|---|
| 6,918,224 B2 | 7/2005 | Tjoelker et al. |
| 7,073,259 B2 | 7/2006 | Sundgren et al. |
| 7,115,176 B2 | 10/2006 | Sundgren et al. |
| 7,387,694 B2 | 6/2008 | Siebenlist et al. |
| 7,451,630 B2 | 11/2008 | Tjoelker et al. |
| 2002/0069945 A1 | 6/2002 | Streubel et al. |
| 2003/0189027 A1 | 10/2003 | Garcia Gomez |
| 2005/0274718 A1 | 12/2005 | Shikuwa et al. |
| 2006/0137779 A1 | 6/2006 | Brodt et al. |
| 2007/0175040 A1 | 8/2007 | Bayer et al. |

FOREIGN PATENT DOCUMENTS

| | | |
|---|---|---|
| SU | 468 961 A1 | 4/1975 |
| WO | 98/27235 | 6/1998 |

\* cited by examiner

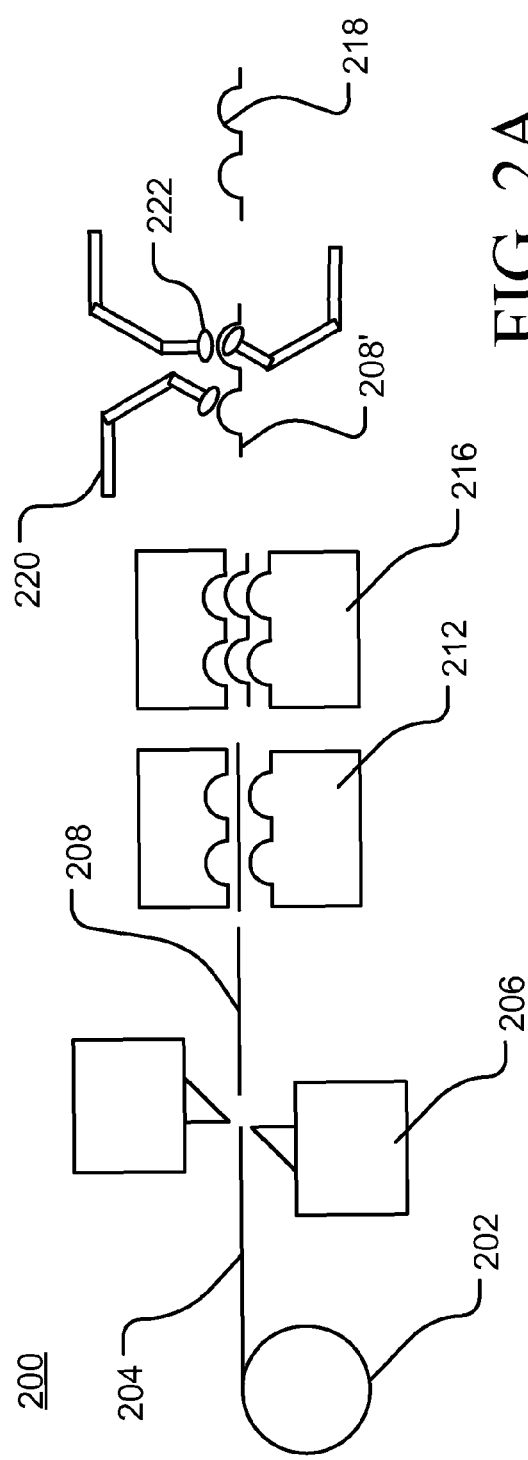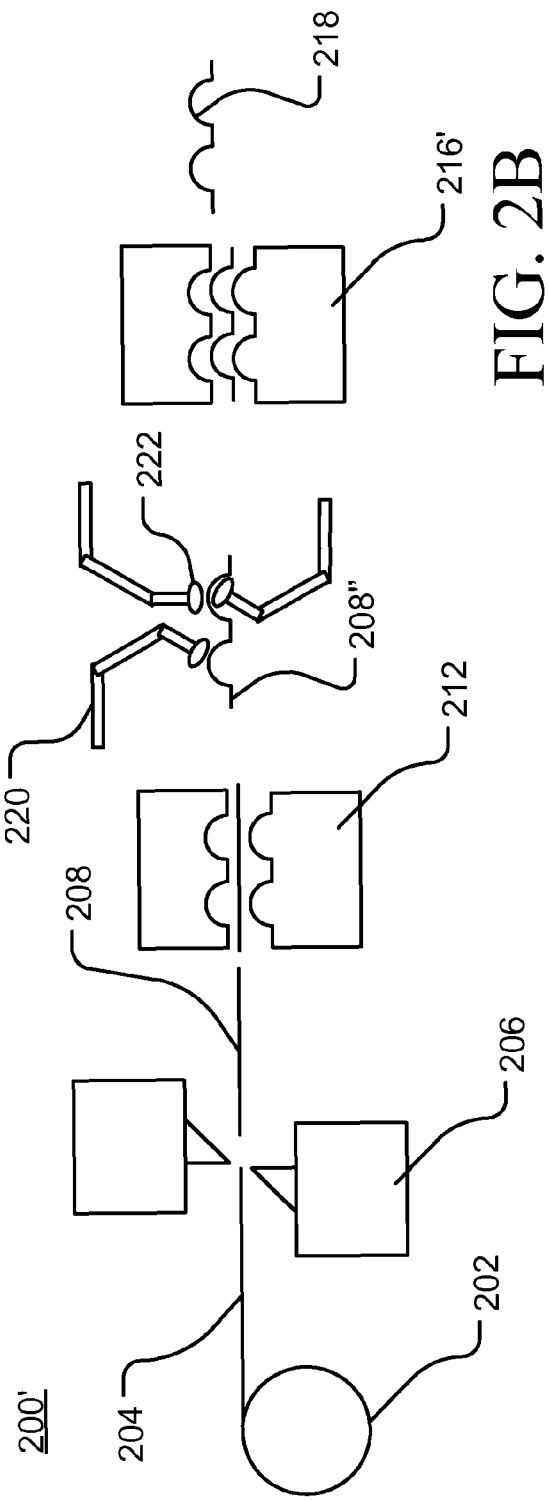

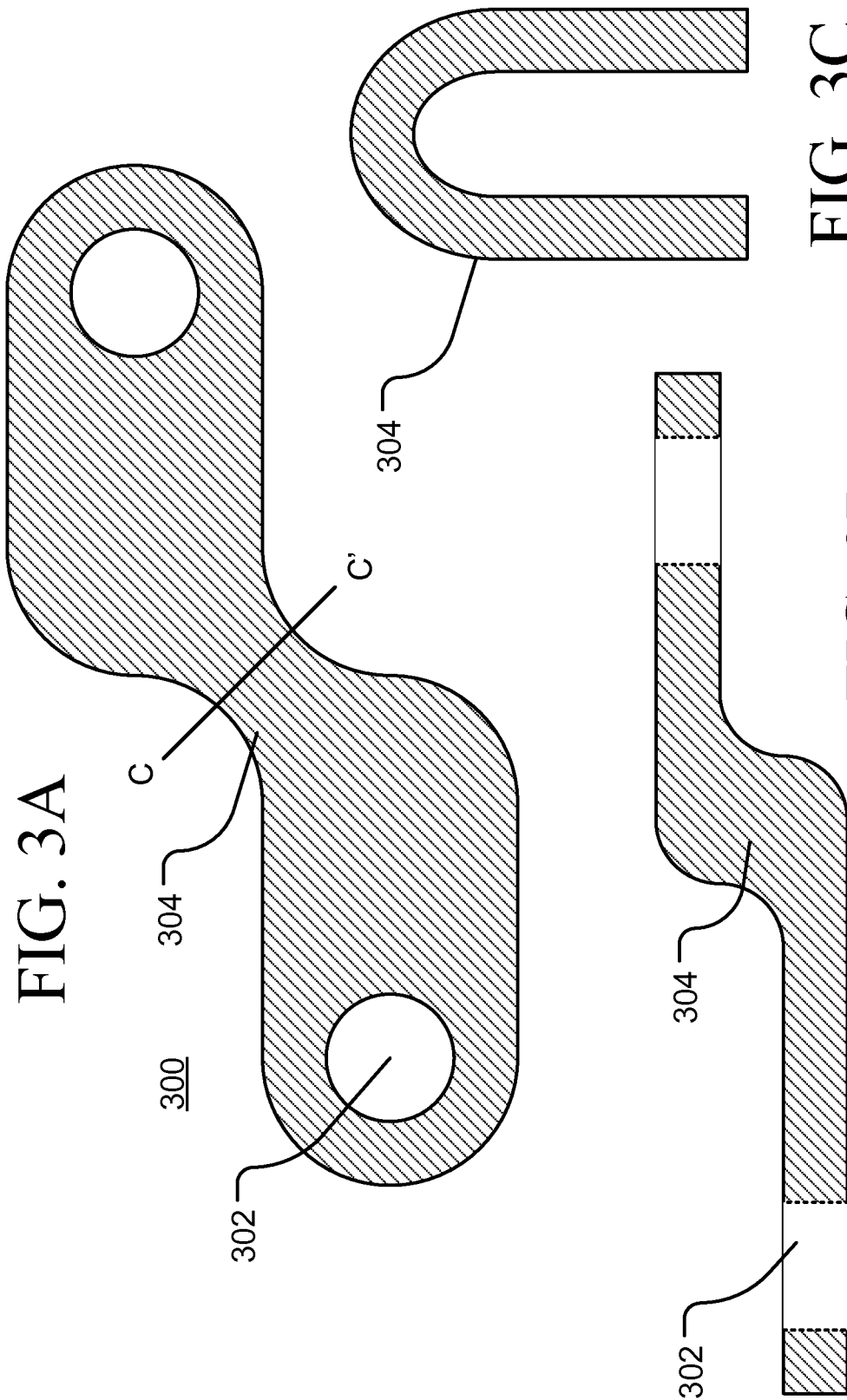

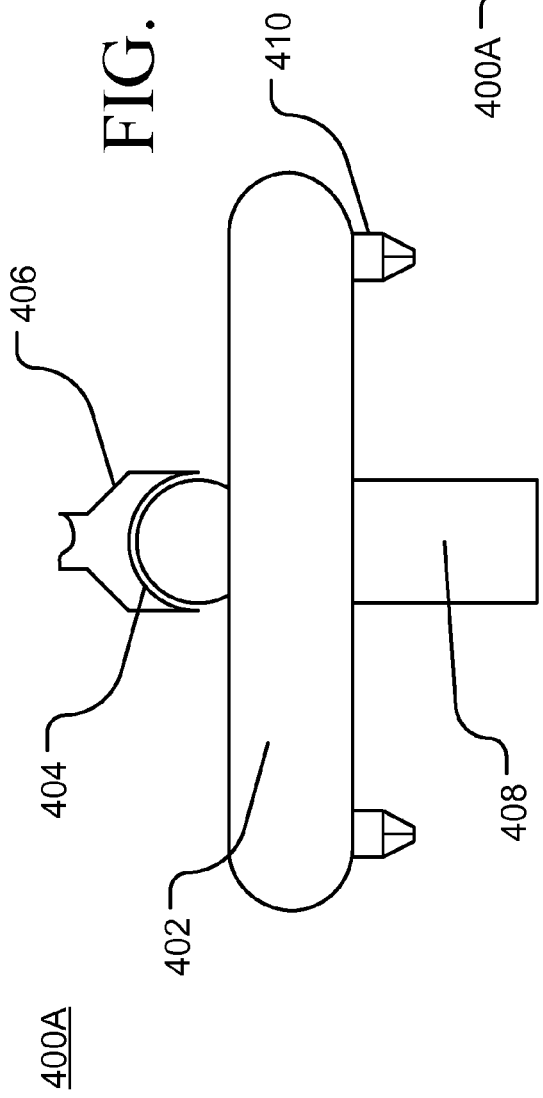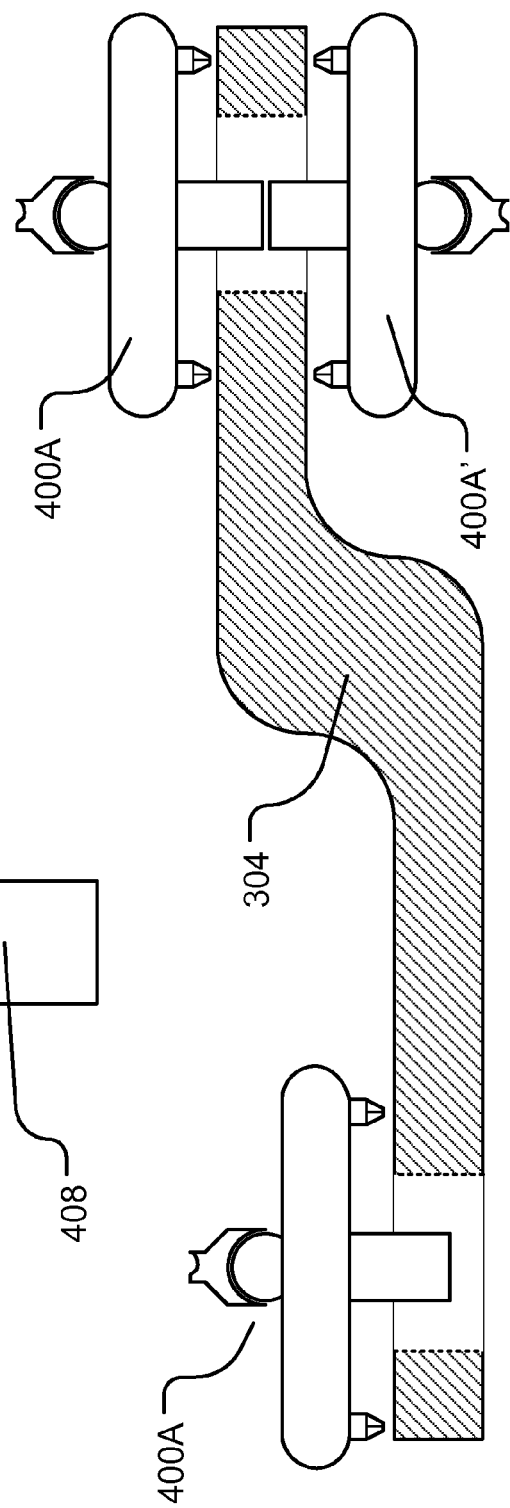

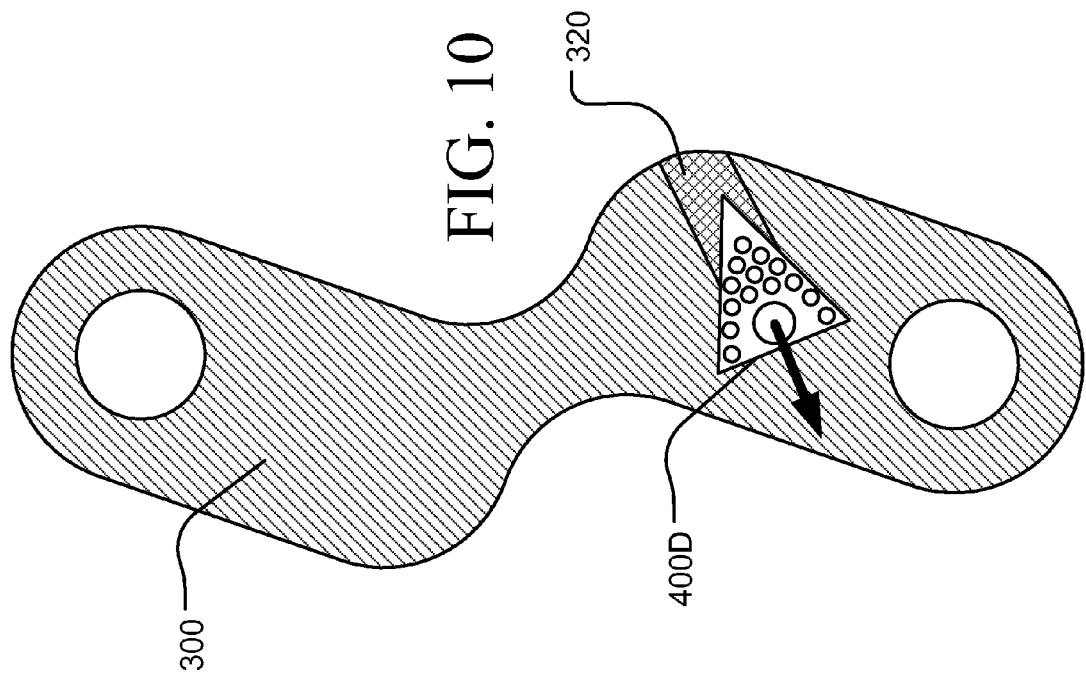
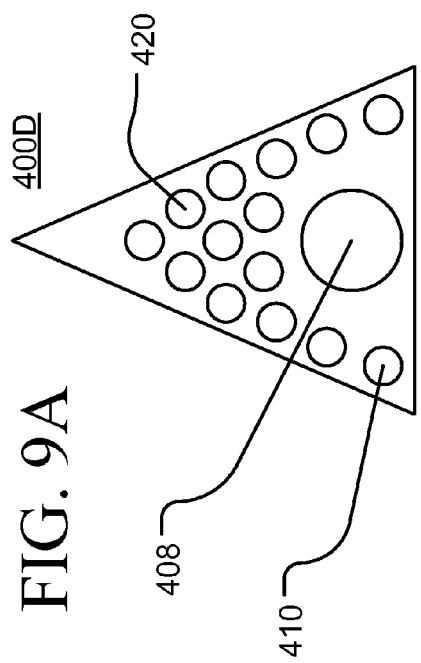
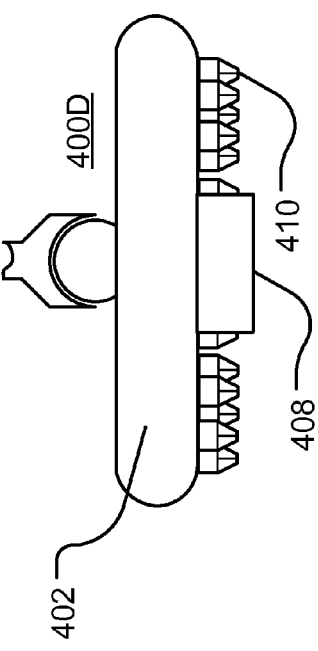

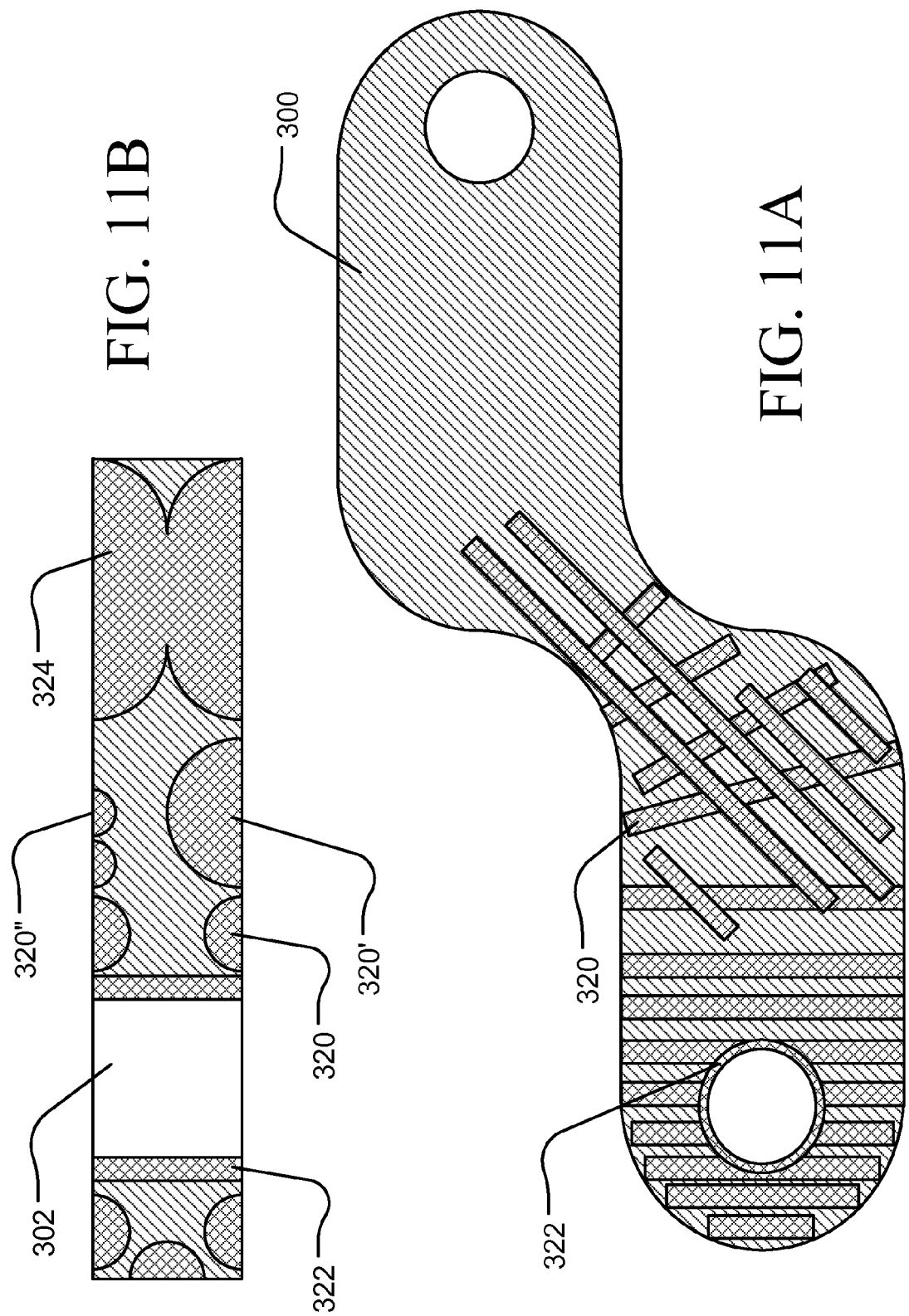

TAILORED HARDENING OF BORON STEEL

BACKGROUND OF THE INVENTION

This invention relates to methods and apparatus for strategically strengthening steel members that can exhibit complex 3D geometries including, for example, vehicular components such as impact door beams, roof and pillar support components and suspension components.

Automotive vehicles employ crash energy management impact beams for protection of passengers, many of which utilize a closed structure type, e.g., square or cylindrical tubing. Such closed beams typically have both a generally uniform wall thickness and lack exposed edges or flanges, the absence of which renders them better suited for conventional induction heat treatment. In such heat treatment processes, the beam is surrounded by a corresponding heat treatment induction coil that, when energized, heats the beam to a target temperature range after which the heated beam is quenched to fix the desired structural properties.

Alternatives to the tubular beam structures may be prepared by taking flat steel sheets and then forming an open beam structure by cold stamping, rolling and/or milling. The hardness and strength of such open beam structures, however, can be limited by the requirement that the metal hardness must be low enough so as to allow for the degree of deformation that will be induced by the stamping and/or rolling operations. As another alternative, harder steel may be hot formed into the desired configuration, but the added complexity of such processing results in higher costs per piece and in the initial capital investment.

Previous efforts to form open section type impact structures from low strength steel, and then heat treat the structures using conventional post-forming techniques have several limitations that tend to produce unacceptable results. For example, using standard induction heating with encircling coils, the free or exposed edges of the structures tend to become overheated and/or burned, while the remainder of the structure may fail to reach the target temperature range. As a result, the heat treated structure will not tend to 1) exhibit the target strength characteristics and/or 2) exhibit sufficiently uniform characteristics. Similarly, the heated open section type impact structures are more prone to distortion during subsequent quenching operations. Accordingly, it has been difficult to meet the required quality standards for cost-effective production of open section type impact structures for assembly in an automobile or other vehicle.

As used herein, "rolling" refers to a metal forming process in which metal stock is passed through at least one pair of rollers and is classified according to the temperature of the metal being rolled. If the temperature of the metal is above its recrystallization temperature while it is being worked, e.g., rolled, drawn or stamped, then the process is considered to be "hot" working, but if the temperature of the metal is below its recrystallization temperature, the process is considered to be "cold" working.

Steel hardening processes include thermal processes during which the steel is heated to a sufficiently high temperature (by, for example, direct application of a flame, contact heating or induction heating) then cooled rapidly, i.e., quenched, to fix the desired microstructure. In a "case" hardening process the necessary temperatures are generally confined to a surface portion of a steel element to form a "case" of hardened material, e.g., martensite, over a core of softer steel. Steel hardened in such a fashion tends to exhibit a combination of toughness and durability to provide a long service life while resisting catastrophic failure.

Other processes may be utilized for case hardening steel including, for example, carburization in which the steel is exposed to a carbon rich environment while being maintained at elevated temperatures and then quenched to provide a carbon-enriched surface layer. Depending on the configuration and intended use of the steel element, carburization can be applied only to selected regions to provide, for example, increased durability for load bearing surfaces.

Nitriding is another hardening technique in which the surface of the steel is exposed to a nitrogen rich environment while being maintained at elevated temperatures and then quenched to provide a nitride-enriched surface layer. The nitrogen reacts with one or more nitride forming elements including, for example, chromium, molybdenum and/or aluminum, present in the steel alloy. Nitriding can provide certain advantages as a hardening technique including, for example, reduced distortion that makes it suitable for hardening structural elements after they have been quenched, tempered and machined into substantially final form. Other case hardening techniques well known to those skilled in the art include, for example, cyaniding, carbonitriding and ferritic nitrocarburizing.

Differential hardening is a method used for providing a local increase in the hardness, e.g., the cutting edge of a tool, without rendering the bulk of the tool unacceptably brittle. In order to achieve this effect, the tool may be subjected to differential cooling in which the cutting edge is cooled more rapidly than the bulk of the tool by insulating or otherwise protecting the bulk of the tool from the quenching operation. A related process, differential tempering relies on quenching the tool or piece uniformly, then differentially tempering one or more portions with a targeted heat source to reduce the hardness in the heated portions.

BRIEF SUMMARY

One aspect of the present disclosure is a method of making an automobile component, especially a vehicle impact beam or suspension component having a complex three dimensional open structure by cold forming the component from unhardened steel stock, and then selectively heat treating the steel to provide the desired strength profile across the component. Another aspect of the present disclosure is a method of hardening a steel component having a complex three dimensional open structure through the application of one or more case hardening techniques. Another aspect of the present disclosure includes a variety of apparatus and mechanisms for practicing the disclosed methods.

The steel component is preferably formed of unhardened steel at or near ambient temperature from flat stock through a combination of rolling, stamping and/or milling to produce a complex three dimensional open structure. The formed component is then hardened in strategically predetermined areas by sequentially heating and quenching the predetermined areas of the component. The necessary heating may be achieved through proximity coil induction heating, flame heating, resistance heating, conduction heating or any other technique that has the ability to reach the desired temperatures on a limited region of the component. The subsequent quenching may be achieved by application of cooling fluid to the previously heated regions of the component using any apparatus or technique capable of achieving the desired cooling profile. The heating and cooling elements are provided on at least one robotic apparatus configured for moving the elements across the surface of the component in a manner sufficient to achieve the desired pattern of hardened regions across the component.

These and other features, advantages and aspects of the present invention will be further understood and appreciated by those skilled in the art by reference to the following specification, claims and appended drawings.

BRIEF DESCRIPTION OF THE DRAWINGS

The disclosure will be more fully understood from the following detailed description, taken in connection with the accompanying drawings, in which:

FIGS. 2A and 2B are schematics illustrating example embodiments of methods according to the disclosure for producing hardened steel components;

FIGS. 3A-C illustrate an example embodiment of a complex three dimensional open structure that can be processed using the methods and apparatus as detailed in the disclosure;

FIG. 4 illustrates an example embodiment of a treatment head that can be used in practicing the methods as detailed in the disclosure;

FIG. 5 illustrates example embodiments of methods for hardening a steel component according to FIG. 3B by employing at least one treatment head according to FIG. 4;

FIGS. 9A and 9B illustrate two views of an example embodiment of a combination treatment head that can be used in practicing the methods as detailed in the disclosure;

FIG. 10 illustrates an example embodiment of a method for hardening a steel component according to FIG. 3A by employing at least one heat treatment head according to FIGS. 9A-B; and FIGS. 11A and 11B illustrate example embodiments of the patterns of hardened regions that can be applied to a steel component according to FIG. 3A by employing at least combination treatment head.

It should be noted that these Figures are intended to illustrate the general characteristics of methods, structures and/or materials utilized in certain example embodiments and to supplement the written description provided below. These drawings are not necessarily, however, to scale and may not precisely reflect the precise structural or performance characteristics of any given embodiment, and, accordingly, should not be interpreted as unduly defining or limiting the range of values or properties encompassed by example embodiments.

DETAILED DESCRIPTION OF EXAMPLE EMBODIMENTS

Although, for purposes of description, "upper," "lower," "right," "left," "rear," "front," "vertical," "horizontal," and derivatives may be used for convenience with respect to the orientation of the components and elements as illustrated in the accompanying drawings, it should be understood that the disclosure is not so limited and may assume various alternative orientations and configurations, except where such alternatives are expressly precluded. It should also be understood that the specific devices and processes illustrated in the attached drawings, and described in the following specification, are simply exemplary embodiments of the methods and apparatus as defined in the appended claims. Accordingly, specific dimensions and other physical characteristics relating to the embodiments disclosed herein are not to be considered as limiting, unless the claims expressly state otherwise.

Figure 1:
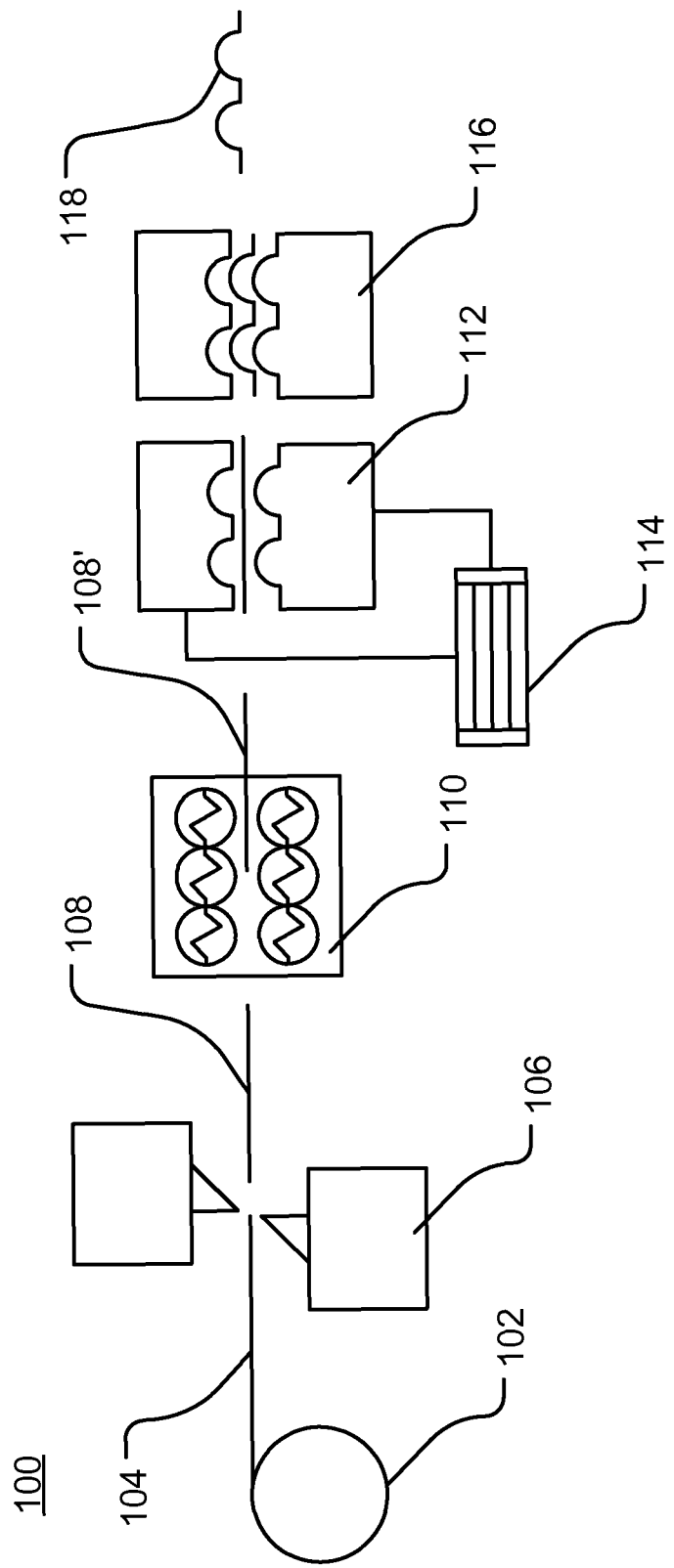
FIG. 1 is a schematic illustrating a conventional method for producing hardened steel components.

Referring now to the drawings, FIG. 1 illustrates a conventional production sequence 100 in which unhardened steel stock 104 is drawn from a roll 102 and passed through a cutting apparatus 106 in which unhardened steel blanks 108 are cut from the stock 104. The blanks 108 are then fed into a furnace or other heating apparatus 110 to bring the blank 108 to working temperature. Once the working temperature has been obtained, the heated blank 108' is moved to a pressing apparatus 112 where it is pressed between a pair of die to produce the desired component. The pressing apparatus is typically associated with a cooling apparatus 114 whereby the heated blank 108' can be quenched within the pressing apparatus 112 and thereby produce a hardened component.

The hardened component may then be subjected to additional processing such as trimming, drilling or milling in subsequent operations 116 to produce the final component 118. Working with the heated blank 108', however, introduces a number of complications into the production sequence with respect to both the complexity and cost of equipment configured for heating, handling and cooling the material as well as the limited time available after removing the heated blank 108' from the heating apparatus 110 and completing the forming operation.

FIG. 2A illustrates an example embodiment of a production sequence 200 in which unhardened metal stock 204 is drawn from a roll 202 and passed through a cutting apparatus 206 in which unhardened blanks 208 are cut from the stock. Although described herein with respect to metal (or steel), it is to be understood that the unhardened metal stock 204 may be any unhardened metal or metal alloy. The blanks 208 are then fed into a pressing apparatus 212 where it is pressed between a pair of die to produce the desired component. The formed component may then be subjected to additional processing such as trimming, drilling or milling in subsequent operations 216 to produce the final component configuration 208'.

The component 208' is then moved into a hardening area in which one or more robotic arms 220 are configured to move one or more treatment heads 222 across the surface and/or into recesses and through holes on the component 208'. The treatment heads are typically configured to provide at least heating and quenching functionality whereby those regions of the component 208' adjacent the treatment head 222 may be subjected to a temperature profile sufficient to achieve the desired hardening to form the final part 218, also referred to as a fully formed part or simply a formed part.

FIG. 2B illustrates another example embodiment of a production sequence 200' in which unhardened metal stock 204 is drawn from a roll 202 and passed through a cutting apparatus 206 in which unhardened blanks 208 are cut from the stock. Although described herein with respect to metal (or steel), it is to be understood that the unhardened metal stock 204 may be any unhardened metal or metal alloy. The blanks 208 are then fed into a pressing apparatus 212 where it is pressed between a pair of die to produce the basic shape of the desired component 208".

The shaped component 208" is then moved into a hardening area in which one or more robotic arms 220 are configured to move one or more treatment heads 222 across the surface and/or into recesses on the component 208". The treatment heads are typically configured to provide at least heating and quenching functionality whereby those regions of the component 208" adjacent the treatment head 222 may be subjected to a temperature profile sufficient to achieve the desired hardening. The formed and hardened component may then be subjected to additional processing such as trimming, drilling or milling in one or more subsequent operations 216 to produce the final component configuration 218. FIGS. 3A-3C illustrate an embodiment of a component 300 having a complex three dimensional open structure with two through holes 302 and a web region 304.

FIG. 4 illustrates an example embodiments of a treatment head assembly 400A that includes a head plate 402, a positioning apparatus 404 configured for movement relative to a robotic arm 406. The combination of the robotic arm 406 and the positioning apparatus 404 can provide for positioning the treatment head 400A with a number of degrees of freedom as necessary to allow the treatment head 400A to access all the necessary portions of the component 300.

The treatment head assembly 400A is also provided with an inductive heating element 408 or other suitable heating device and quenching fluid nozzles 410 that may be utilized for limiting the lateral heat transfer during the heating process and/or for quenching the heated regions of the component 300 after the heating is terminated. As illustrated in FIG. 4, the treatment head assembly 400A can be used singly, independently or in combination 400A, 400A' for selectively hardening predetermined regions of the component 300 including, for example, the bearing surfaces of the through holes 302.

Figure 6:
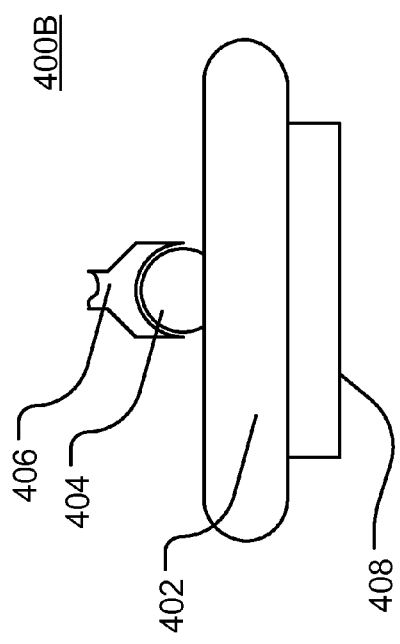
FIG. 6 illustrates an example embodiment of a heating treatment head that can be used in practicing the methods as detailed in the disclosure.
Figure 7:
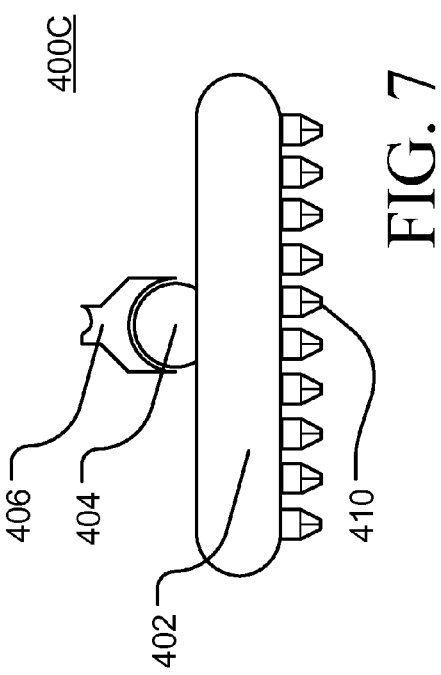
FIG. 7 illustrates an example embodiment of a quenching treatment head that can be used in practicing the methods as detailed in the disclosure.

FIG. 6 illustrates another example embodiment of a treatment head assembly 400B that includes a head plate 402, a positioning apparatus 404 configured for movement relative to a robotic arm 406. The treatment head assembly 400B is also provided with an inductive heating element 408 or other suitable heating device for heating a region of the component 300 adjacent to the treatment head assembly 400B. FIG. 7 illustrates another example embodiments of a treatment head assembly 400C that includes a head plate 402, a positioning apparatus 404 configured for movement relative to a robotic arm 406.

The treatment head assembly 400C is also provided with a plurality of quenching/treatment fluid nozzles 410 that may be utilized for quenching those regions of the component 300 previously heated by a treatment head assembly such as that illustrated in FIG. 6 and/or applying a treatment gas including, for example, carbon containing compounds and/or nitrogen containing compounds to achieve additional case hardening after the heating is terminated.

Figure 8:
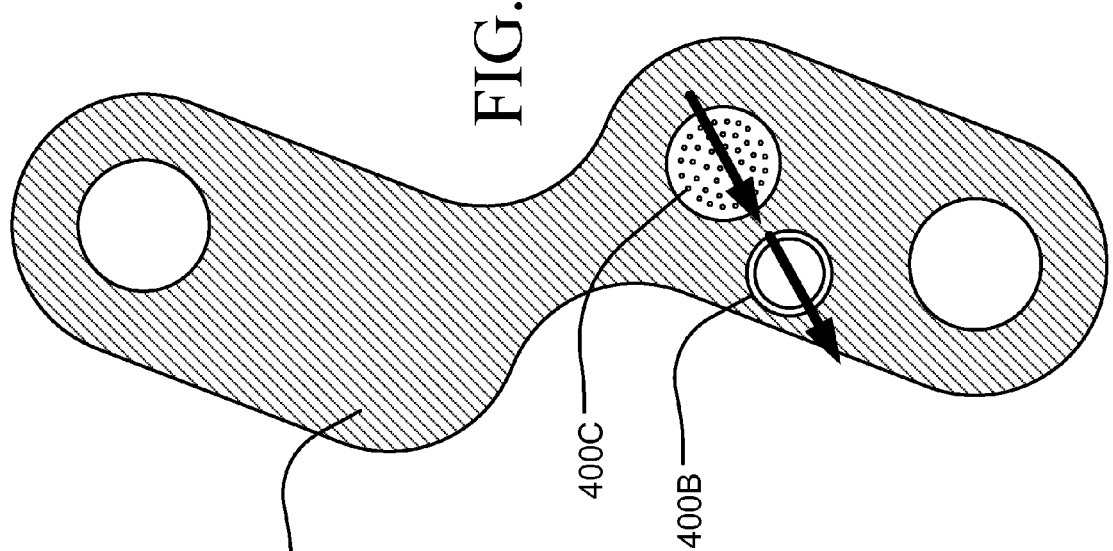
FIG. 8 illustrates an example embodiment of a method for hardening a steel component according to FIG. 3A by employing at least one heat treatment head according to FIG. 6 and one quenching treatment head according to FIG. 7.

FIG. 8 illustrates an example embodiment of a method of treating a component 300 using two treatment heads 400B, 400C in combination whereby the quenching treatment head 400C follows the heating treatment head 400B across the surface of the component 300. Although providing the treatment heads 400B, 400C on separate robotic assemblies would provide increased flexibility with regard to positioning and application, it would be possible to provide the two heads 400B, 400C on a single unified assembly (not shown).

FIGS. 9A and 9B illustrate another example embodiment of a treatment head assembly 400D that includes a head plate 402, with an inductive heating element 408 or other suitable heating device and a plurality of quenching/treatment fluid nozzles 410 that may be utilized for 1) limiting the lateral heat transfer during the heating process, 2) quenching the heated regions of the component after the heating is terminated and/or 3) applying a treatment fluid to the heated surface of the component 300. As illustrated in FIG. 10, the treatment head assembly 400D will typically be used in an orientation in which the heating element 408 is positioned toward the leading edge of the treatment head assembly 400D with a single pass being sufficient to harden a region 320 of the component 300.

FIGS. 11A and 11B illustrate example embodiments of hardened regions within a component 300 reflecting some of the options made possible by the controlled application of one or more treatment head assemblies. As reflected in FIG. 11A, the pattern of hardened regions may be adapted to provide controlled variation in the hardness of the component 300 whereby those regions expected to be subject to increased wear can be protected while other regions can be used to control failure modes of the component 300 and reduce the likelihood of fracture.

As reflected in FIG. 11A, because the treatment head assemblies can be freely moved across the surface of the component 300, the spacing, orientation and/or overlap of the hardened regions 320 can be adapted as necessary to achieve the desired strength profile. Further, as illustrated in FIG. 11B, the hardening effects can be controlled to provide hardened bearing surfaces 322 on through holes 302 or recessed regions (not shown), "case" hardening of different depths 320, 320', 320" or full thickness hardening 324.

Although not illustrated, those skilled in the art will appreciate that the component 300 may be retained within a moveable fixture that could be used to rotate the component 300 on one or more axes to provide better access for the treatment head assemblies. Similarly, depending on the configuration of the robotic arm assembly 220, a single arm assembly may be configured for attachment of a range of tools whereby a plurality of treatment head assemblies could be used to provide increased treatment areas for application to substantially planar regions and reduced and/or elongated treatment areas for application to more complex and/or restricted regions of the component surface.

The treatment head(s) can be configured with sensors for improved control of the hardening and/or surface treating processes including, for example, proximity sensors for controlling the spacing between the treatment head and the region of the component being treated, thermal sensors for controlling the heating and/or cooling temperatures and thermal profiles. As will be appreciated by those skilled in the art, it is the relative movement of the treatment head(s) and the component that allow of the selective heat and/or surface treatment of the unhardened part and that this relative motion can be achieved using a variety of apparatus. For example, the component may be positioned in a fixed jig while the treatment head(s) are independently moved across the surface and along the complex 3D profile of the component under treatment. Alternatively, the component may be carried by a fixture that provides controlled movement in one or more axes relative to the treatment heads, thereby improving access, particularly for recessed regions, during the processing sequence.

As suggested by FIGS. 11A and 11B, the resulting components 300 can exhibit significantly increased tensile and yield strengths compared to the known prior art hot stamped components. As also suggested, the method and apparatus disclosed allow the characteristics of a particular component to reflect substantially non-uniform strength properties, thereby allowing components to be more closely adapted for specific applications, thereby improving performance. For example, a suspension component may be configured with harder attachment regions separated by a predetermined yield region that, during an accident, would control where and at what loading the component would fail, thereby allowing the engineers to protect more vital components. Similarly, relative to unhardened materials, a selectively hardened component according to the disclosure can enable a lighter weight beam to be employed, thereby reducing manufacturing costs and improving vehicle efficiency without sacrificing performance.

Further, although the components manufactured according to the methods and systems disclosed herein will typically include at least one hardenable layer of a metal, the overall component construction is not so limited and may incorporate other materials, including, e.g., carbon fiber, refractory fibers and/or ceramic materials, for adapting the component(s) to the intended use(s). This enables a lighter weight beam to be employed, thereby reducing manufacturing costs and improving vehicle efficiency.

While the present disclosure as included descriptions of various embodiments of the methods and apparatus for practicing the methods, it should be understood that these embodiments are not intended to limit the disclosure and that it would be within the ability of one of skill in the art, guided by the present disclosure, to adapt the methods and apparatus disclosed to specific applications. Accordingly, the present disclosure is intended to encompass such alternatives, modifications, and equivalents as may be included within the spirit and scope of the appended claims.

We claim:

1. A method of manufacturing a selectively hardened complex metal component comprising:

pressing an unhardened metal blank to form an unhardened complex part, the part including a first surface;

providing a movable treatment head including a heating element;

heating a first region of the first surface to a temperature above the crystallization point by moving the heated element along a first path;

quenching the heated first region to provide a first hardened region within the part;

heating a second region of the first surface to a temperature above the crystallization point by moving the heating element alone a second path that is different than the first path; and quenching the heated second region to provide a second hardened region within the part.

2. The method of manufacturing a selectively hardened complex metal component according to claim 1, wherein the first hardened region is separated from the second hardened region on the first surface by an unhardened region.

3. The method of manufacturing a selectively hardened complex metal component according to claim 2, further comprising:

positioning a first fluid nozzle and a second fluid nozzle on opposite sides of the heating element, wherein the nozzles and the heating element are positioned along a line perpendicular to the first path; and positioning a third fluid nozzle rearward of the heating element along the first path;

wherein the quenching step comprises moving the nozzles and the treatment head along the first path and applying fluid to the part during heating of the first region to limit lateral heat transfer to portions of the part outside of the first region and to quench the heated first region.

4. A method of manufacturing a selectively hardened complex metal component comprising:

providing an unhardened part;

providing a movable treatment head comprising:

a surface with a leading edge, a trailing edge, a first side extending from the leading edge to the trailing edge, and a second side extending from the leading edge to the trailing edge;

a heating element extending from the surface and positioned adjacent the leading edge;

a first fluid nozzle positioned adjacent the leading edge and between the heating element and the first side;

a second fluid nozzle positioned adjacent the leading edge and between the heating element and the second side;

a third fluid nozzle positioned between the heating element and the trailing edge;

heating a first region of the unhardened part with the heating element to a temperature above the crystallization point by moving the treatment head along the first region; and applying fluid to the part with the nozzles during heating of the first region to limit lateral heat transfer to portions of the part outside of the first region and to quench the heated first region to provide a first hardened region within the part to form a selectively hardened part.

5. The method of manufacturing a selectively hardened complex metal component according to claim 4, wherein the surface is triangular in shape and the first side and the second side extend from the leading edge and intersect at a point defining the trailing edge.

6. The method of manufacturing a selectively hardened complex metal component according to claim 5, wherein a plurality of fluid nozzles are positioned in a line along the first side between the first nozzle and the third nozzle, wherein a plurality of fluid nozzles are positioned in a line along the second side between the second nozzle and the third nozzle, and wherein a plurality of nozzles are positioned between the heating element and the third nozzle.

7. A method of manufacturing a selectively hardened metal component comprising:

providing a part including a first surface;

providing a movable treatment head comprising:

a second surface including a leading edge, a trailing edge, a first side extending from the leading edge to the trailing edge, and a second side extending from the leading edge to the trailing edge;

a heating element extending from the second surface and positioned adjacent the leading edge;

a first fluid nozzle positioned adjacent the leading edge and between the heating element and the first side;

a second fluid nozzle positioned adjacent the leading edge and between the heating element and the second side;

a third fluid nozzle positioned between the heating element and the trailing edge;

positioning the treatment head opposite the first surface of the part;

heating a first region on the first surface of the part by moving the treatment head along a first path;

applying fluid to the first surface of the part with the nozzles during heating of the first region to limit lateral heat transfer to portions of the first surface outside of the first region and to quench the heated first region to provide a first hardened region within the part;

heating a second region on the first surface of the part by moving the treatment head along a second path that is different than the first path; and applying fluid to the first surface with the nozzles during heating of the second region to limit lateral heat transfer to portions of the first surface outside of the second region and to quench the heated second region to provide a second hardened region within the part, wherein the first hardened region is separated from the second hardened region on the first surface by an unhardened region.

\* \* \* \* \*